Dec. 3, 1935.  G. O. BUCK  2,023,306
TIRE VALVE RETAINER
Filed Feb. 4, 1935  2 Sheets-Sheet 1

Inventor
Glenn O. Buck,
By Clarence A. O'Brien
Attorney

Dec. 3, 1935. G. O. BUCK 2,023,306
TIRE VALVE RETAINER
Filed Feb. 4, 1935 2 Sheets-Sheet 2
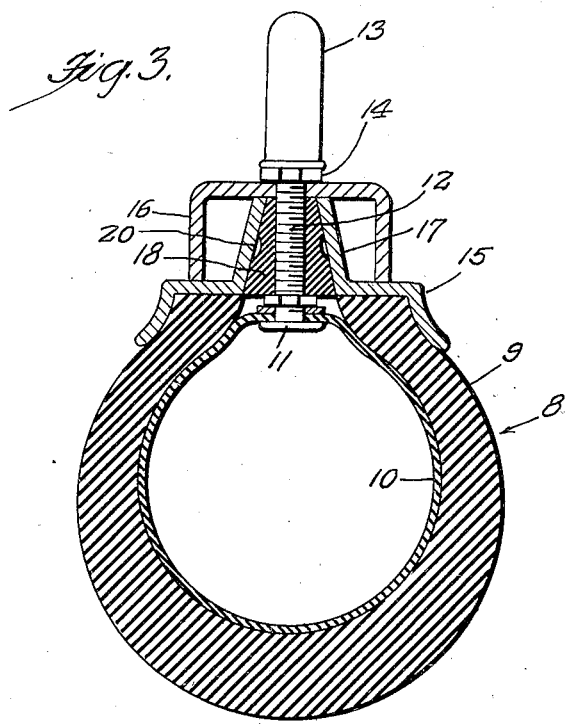
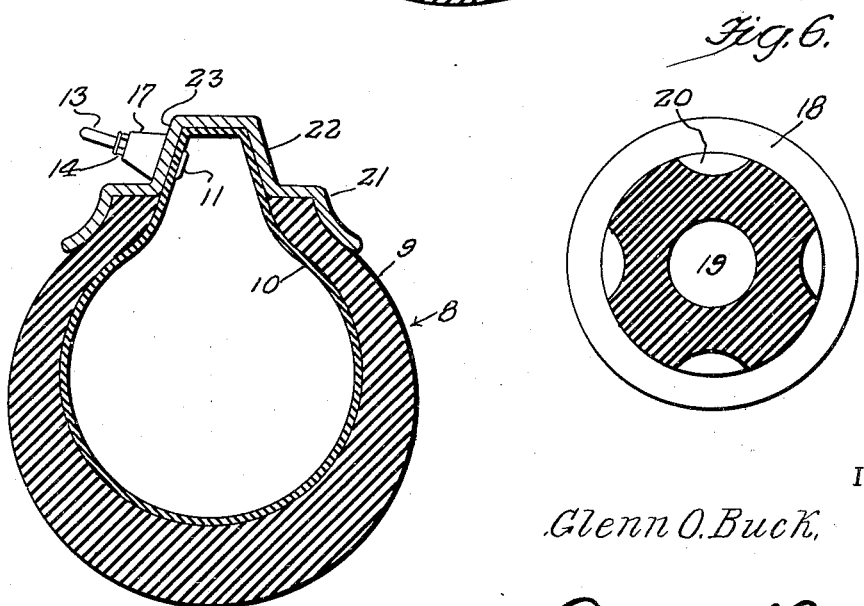
Inventor
Glenn O. Buck,
By Clarence A. O'Brien
Attorney Patented Dec. 3, 1935

2,023,306

UNITED STATES PATENT OFFICE 2,023,306

TIRE VALVE RETAINER

Glenn Oscar Buck, Tigerton, Wis.

Application February 4, 1935, Serial No. 4,978

4 Claims. (Cl. 152—12)

This invention relates to pneumatic tires and accessories therefor and has more specific reference to a novel stabilizing and fastening device for an inflation valve.

In order to render the operation of the conventional inflating valve more successful and dependable and to minimize twisting and displacement such as causes disruption and leaks, I have evolved and produced a novel guide and stabilizing means for the threaded stem of the valve.

In reducing the invention to practice I have perfected a simple and economical arrangement characterized by a resilient sleeve-like bushing through and beyond which the valve stem extends, means being provided for securely attaching said bushing to the tire casing rim.

The particular factors of configuration and explicit association will become more readily apparent from the following description and drawings.

In the drawings:—

Figure 3 is a transverse sectional view on a slightly enlarged scale.

Figure 6 is a view showing the manner in which the bushing fits in said socket.

Figure 7 is a modification showing the way in which the invention is applicable to the drop center type of rim with the valve on one side, the principle of the invention being the same as in the other figures.

Figure 1:
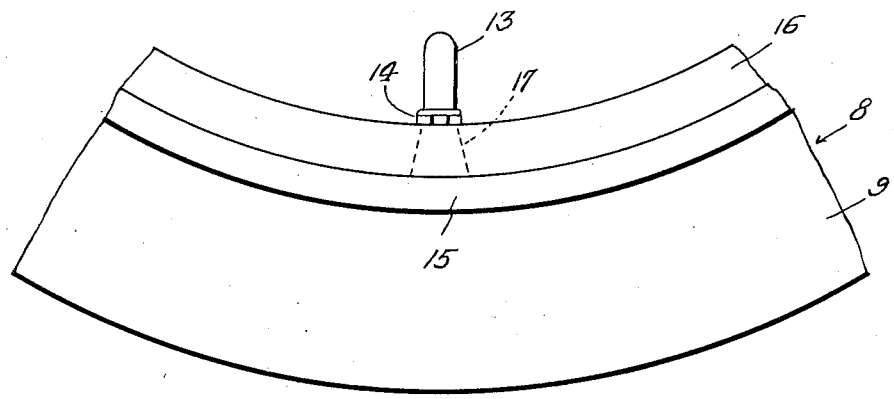
Figure 1 is a fragmentary side elevational view of a portion of a tire, rim and valve assembly illustrating, in dotted line, the approximate location of the improved valve stem guide and stabilizing means.
Figure 4:
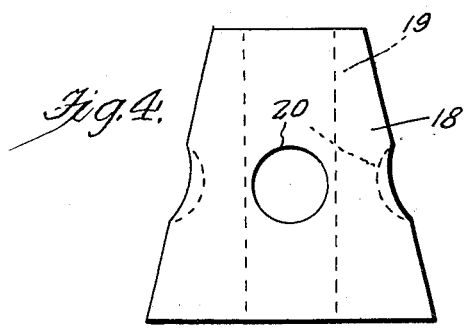
Figure 4 is an enlarged elevational view of the frustro-conical rubber bushing or sleeve.
Figure 2:
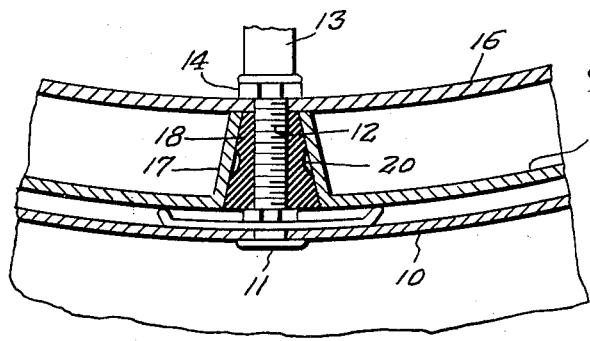
Figure 2 is a longitudinal sectional view with portions in elevation, showing in more reliable detail the allocation and cooperation of parts.
Figure 5:
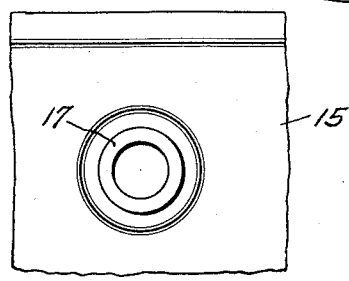
Figure 5 is a fragmentary top plan view showing the truncated conical socket for reception and maintenance of said bushing.

Referring now to the drawings by distinguishing reference numerals it will be observed that the numeral 8 designates a conventional pneumatic tire including a regular casing 9 having an inner tube 10 of customary type. Attached as at 11, in the usual way to the tube is a threaded stem 12 of the inflation valve. The numeral 13 designates a protective cap and 14 a lock nut. In addition the numeral 15 designates a tire casing rim and 16 an inner rim.

In accordance with the principles of the invention the annular web of the rim 15 is provided at a point with an opening through which the valve stem passes. At this point I provide a truncated conical socket 17 which is formed integral with the web and in registration with said valve stem opening. It is preferably made with integral parts of the rim though it may be made separately and welded in place, as an attachment. Obviously this socket serves as a seat and maintaining device for the rubber sleeve or bushing 18. This rubber sleeve is also of frustro-conical type and its tapered end portion corresponds to the retaining socket 17 in which it is firmly seated. The length of the parts 17 and 18 is such as to allow for a slight radial expansion and contraction of the sleeve. The sleeve is formed with a central bore or passage 19 through which the threaded stem extends. In addition it is provided on its exterior with equi-distant circumferentially spaced depressions or cavities 20 which serve as suction cups and which cooperate with the inner wall of the socket 17 in holding the bushing firmly in place. Incidentally the diameter of the bore 19 is such as to provide a snug fit around the threads of the stem and as a result the parts effectively cooperate in providing an air seal. Then, too, it is obvious that these features coact successfully in providing as a unique protecting means against the elements and this minimizes deterioration of the rubber of the inner tube.

It is evident that the invention may be formed as a permanent part of the rim 15 when marketed or that it may be made up as a separate attachment and applied thereto by a slight alteration of the existing type of rim. It is further evident that the web portion of the inner channel-shaped rim 16 cooperates with the truncated apices of the two features 17 and 18 as well as with the clamping nut 14 in effecting a substantially water-proof joint and seal.

In addition I call attention to Figure 7 wherein it will be observed that a slightly different type of rim is indicated at 21, this having the channel-shaped drop center 22 to which the improved valve protecting retaining device is attached. In this instance, it is formed as an integral part of the outer wall 23 of the rim and projects exteriorly in an easily accessible manner. The details of construction are, however, the same as already described and no further description of this arrangement is deemed essential.

Minor changes in shape, size, and rearrangement of details coming within the field of invention claimed may be resorted in actual practice, if desired.

What is claimed is:—

1. In a structure of the class described, a frustro-conical metal socket serving as a holder, a correspondingly proportioned and tapered rubber bushing fitted in said socket, said bushing having a bore for passage of a conventional tire valve stem, and said bushing being provided externally with cavity forming suction cups to facilitate holding the bushing against displacement.

2. In a structure of the class described, a tire rim provided with a valve opening, a tapered metal socket formed integrally with said tire rim and projecting beyond said opening, and a rubber sleeve fitted in said socket and designed to serve as a protective bushing for a complemental tire valve.

3. In a structural assemblage of the class described, in combination, a tire rim having in its felly portion a relatively large valve stem passage and an integral inwardly projecting tapered guide registering with said passage, an inner wheel rim having its felly portion spaced from the corresponding portion of said tire rim and provided with a valve stem opening arranged concentrically with respect to said passage and of a diameter considerably less than the inner end portion of said tapered guide, said guide abutting the outer periphery of said wheel rim felly and surrounding said stem opening, and an elastic lining fitted snugly and removably in said guide and being flush with the opposite ends of the guide and having a central passage in alignment with said valve stem opening.

4. As a new article of manufacture and as a component part of a structural assemblage of the class described, a tapered rubber bushing adapted to fit removably into a correspondingly shaped retention and guide socket, said bushing being centrally bored to accommodate a valve stem, and being formed on its exterior with a plurality of cavities defining suction cups to aid in maintaining it in operative position in said socket.

GLENN OSCAR BUCK.